(12) United States Patent
Suehiro et al.

(10) Patent No.: US 12,085,141 B2
(45) Date of Patent: Sep. 10, 2024

(54) SHOCK ABSORBER

(71) Applicant: Hitachi Astemo, Ltd., Hitachinaka (JP)

(72) Inventors: Masato Suehiro, Hitachinaka (JP);
Atsushi Maeda, Hitachinaka (JP); Yuji Nakayama, Hitachinaka (JP); Takashi Kozono, Hitachinaka (JP); Koichi Yamaka, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 449 days.

(21) Appl. No.: 17/430,439

(22) PCT Filed: Feb. 14, 2020

(86) PCT No.: PCT/JP2020/005745
§ 371 (c)(1),
(2) Date: Aug. 12, 2021

(87) PCT Pub. No.: WO2020/175180
PCT Pub. Date: Sep. 3, 2020

(65) Prior Publication Data
US 2022/0018418 A1  Jan. 20, 2022

(30) Foreign Application Priority Data
Feb. 26, 2019 (JP) ................ 2019-032810

(51) Int. Cl.
*F16F 9/54* (2006.01)
*F16F 9/18* (2006.01)
(Continued)

(52) U.S. Cl.
CPC ............ *F16F 9/54* (2013.01); *F16F 9/182* (2013.01); *F16F 9/3221* (2013.01);
(Continued)

(58) Field of Classification Search
None
See application file for complete search history.

(56) References Cited

U.S. PATENT DOCUMENTS 6,357,564 B1 * 3/2002 Tantius ................ B60G 15/063
188/266.5
2013/0161141 A1   6/2013 Maegawa et al.

FOREIGN PATENT DOCUMENTS

DE           4438384 C1 *  4/1996 ......... B60R 16/0222
DE     202009007569 U1 * 11/2010 ................ F16F 9/38
(Continued)

OTHER PUBLICATIONS

International Search Report issued Apr. 7, 2020 in International (PCT) Application No. PCT/JP2020/005745 with English translation.
(Continued)

*Primary Examiner* — Melanie Torres Williams
(74) *Attorney, Agent, or Firm* — Wenderoth, Lind & Ponack, L.L.P.

(57) ABSTRACT

A mounting eye (21) is fastened to a rod by pushing, partially or over an entire periphery, an outer periphery of a joint portion of a mounting eye into an annular groove of the rod. Accordingly, an axial length of a fastening portion can be set shorter than that of a related-art structure (screw fastening), thereby being capable of securing a stroke of the rod of a shock absorber in which the mounting eye is fastened to the rod.

14 Claims, 9 Drawing Sheets

(51) Int. Cl.
*F16F 9/32* (2006.01)
*B60G 13/08* (2006.01)
*B60G 17/08* (2006.01)
*F16F 9/38* (2006.01)
*F16F 9/46* (2006.01)

(52) U.S. Cl.
CPC ............ *F16F 9/3271* (2013.01); *B60G 13/08* (2013.01); *B60G 17/08* (2013.01); *B60G 2202/24* (2013.01); *B60G 2204/128* (2013.01); *B60G 2204/129* (2013.01); *B60G 2204/40* (2013.01); *B60G 2206/41* (2013.01); *B60G 2206/82092* (2013.01); *B60G 2500/11* (2013.01); *B60G 2800/162* (2013.01); *B60G 2800/916* (2013.01); *F16F 9/38* (2013.01); *F16F 9/463* (2013.01); *F16F 2222/12* (2013.01); *F16F 2226/045* (2013.01); *F16F 2228/066* (2013.01); *F16F 2230/10* (2013.01); *F16F 2230/18* (2013.01); *F16F 2232/08* (2013.01); *F16F 2234/02* (2013.01)

(56) References Cited

FOREIGN PATENT DOCUMENTS

| EP | 1811197 B1 * | 6/2017 | ............ F16F 9/3221 |
| JP | 61-40537 | 3/1986 | |
| JP | 2005-114112 | 4/2005 | |
| JP | 2013-133927 | 7/2013 | |

OTHER PUBLICATIONS

Written Opinion of the International Searching Authority issued Apr. 7, 2020 in International (PCT) Application No. PCT/JP2020/005745 with English translation.

Office Action issued Aug. 17, 2023 in corresponding German Patent Application No. 112020000951.3, with English language translation.

* cited by examiner

SHOCK ABSORBER

TECHNICAL FIELD

The present invention relates to a shock absorber in which a damping force is adjusted by controlling a flow of a working fluid along with a stroke of a rod.

BACKGROUND ART

In Patent Literature 1, the following structure is disclosed. A mounting eye (bearing) is fastened to a rod. One side of a harness (line) is connected to an actuator provided in a cylinder, and another side of the harness extends, through a hollow portion of the rod, from a slit formed in the mounting eye to an outside.

CITATION LIST

Patent Literature

PTL 1: U.S. Pat. No. 6,357,564 B2

SUMMARY OF INVENTION

Technical Problem

In the structure described in Patent Literature 1, the mounting eye and the rod are fastened to each other by screwing. Thus, as an axial length (length in an axial direction) of a fastening portion becomes longer, a stroke of the rod becomes shorter.

The present invention has an object to secure a stroke of a shock absorber in which a mounting eye is fastened to a rod.

Solution to Problem

According to one embodiment of the present invention, there is provided a shock absorber including: a cylinder having a working fluid charged therein; a piston inserted in the cylinder; a hollow rod having one end coupled to the piston and another end extending to an outside of the cylinder; a mounting eye fastened to the another end of the rod, the mounting eye including: an eye portion having a through hole on an inner periphery side thereof, into which a bearing is to be inserted; and a joint portion connecting the eye portion and the rod to each other; the shock absorber further including: an actuator fastened to one end side of the rod; and a harness having one side connected to the actuator and another side extending through a hollow portion of the rod to an outside, wherein the rod has an annular groove on an outer periphery thereof, wherein the mounting eye is joined to the rod such that an outer periphery of the joint portion is pushed, partially or over an entire periphery, into the annular groove, and wherein the another side of the harness extends through a side wall of the joint portion or the eye portion to an outside.

According to one embodiment of the present invention, it is possible to secure the stroke of the shock absorber in which the mounting eye is fastened to the rod.

DESCRIPTION OF EMBODIMENTS

A first embodiment of the present invention is described with reference to accompanying FIG. 1 and FIG. 2. An up-and-down direction of FIG. 1 is provisionally referred to as "up-and-down direction."

Figure 1:
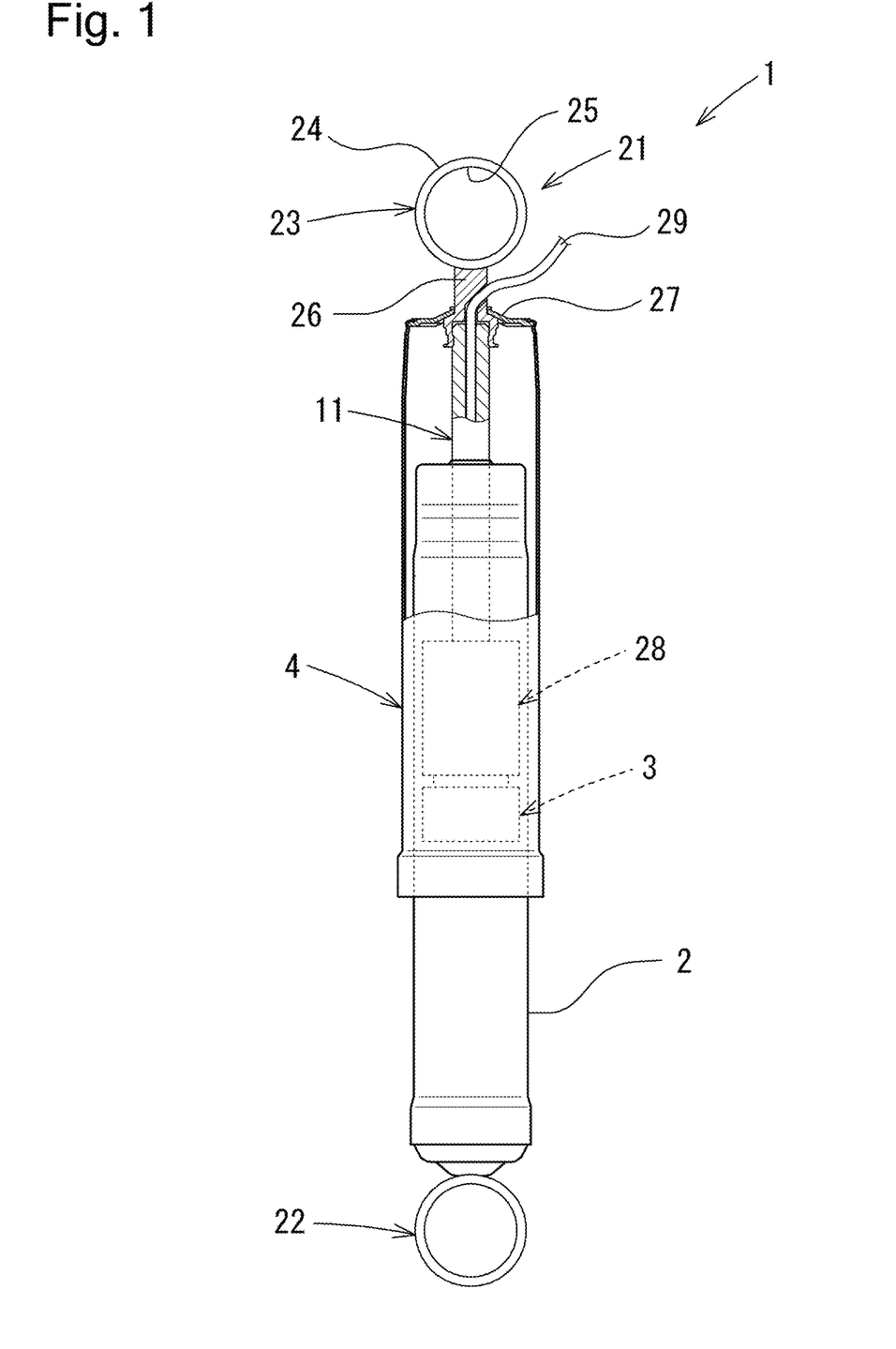
FIG. 1 is a front view for illustrating a shock absorber according to a first embodiment partially in cross section.

Referring to FIG. 1, a shock absorber 1 according to the first embodiment is a so-called damping-force adjustment shock absorber 1 of a control-valve built-in type (hereinafter referred to as "shock absorber 1") in which a damping-force generating mechanism including an actuator 28 (solenoid) is built in a cylinder 2. The basic structure of the damping-force generating mechanism provided in the shock absorber 1 is the same as the structure of a damping-force generating mechanism provided in a related-art damping-force adjustment shock absorber. Thus, for the purpose of simplifying the description of the specification, description related to the damping-force generating mechanism is omitted.

As illustrated in FIG. 1, the shock absorber 1 includes the cylinder 2, a piston 3, a hollow rod 11, a mounting eye 21, a dust cover 4 having a substantially cylindrical shape, and a mounting eye 22. The cylinder 2 has a working fluid such as oil charged therein. The piston 3 is slidably inserted into the cylinder 2. The rod 11 has a lower end portion (one end) coupled to the piston 3 and an upper end portion (another end) extending to an outside of the cylinder 2. The mounting eye 21 is fastened (fixed) to the upper end portion (another end) of the rod 11. The dust cover 4 is held by the mounting eye 21 and covers a portion of the rod 11 projecting from the cylinder 2. The mounting eye 22 is fastened to a lower end portion of the cylinder 2 (on the side opposite to the rod 11). One of the mounting eyes 21 and 22 is mounted on a vehicle body side, and another one of the mounting eyes 21 and 22 is mounted on a wheel side.

Figure 2:
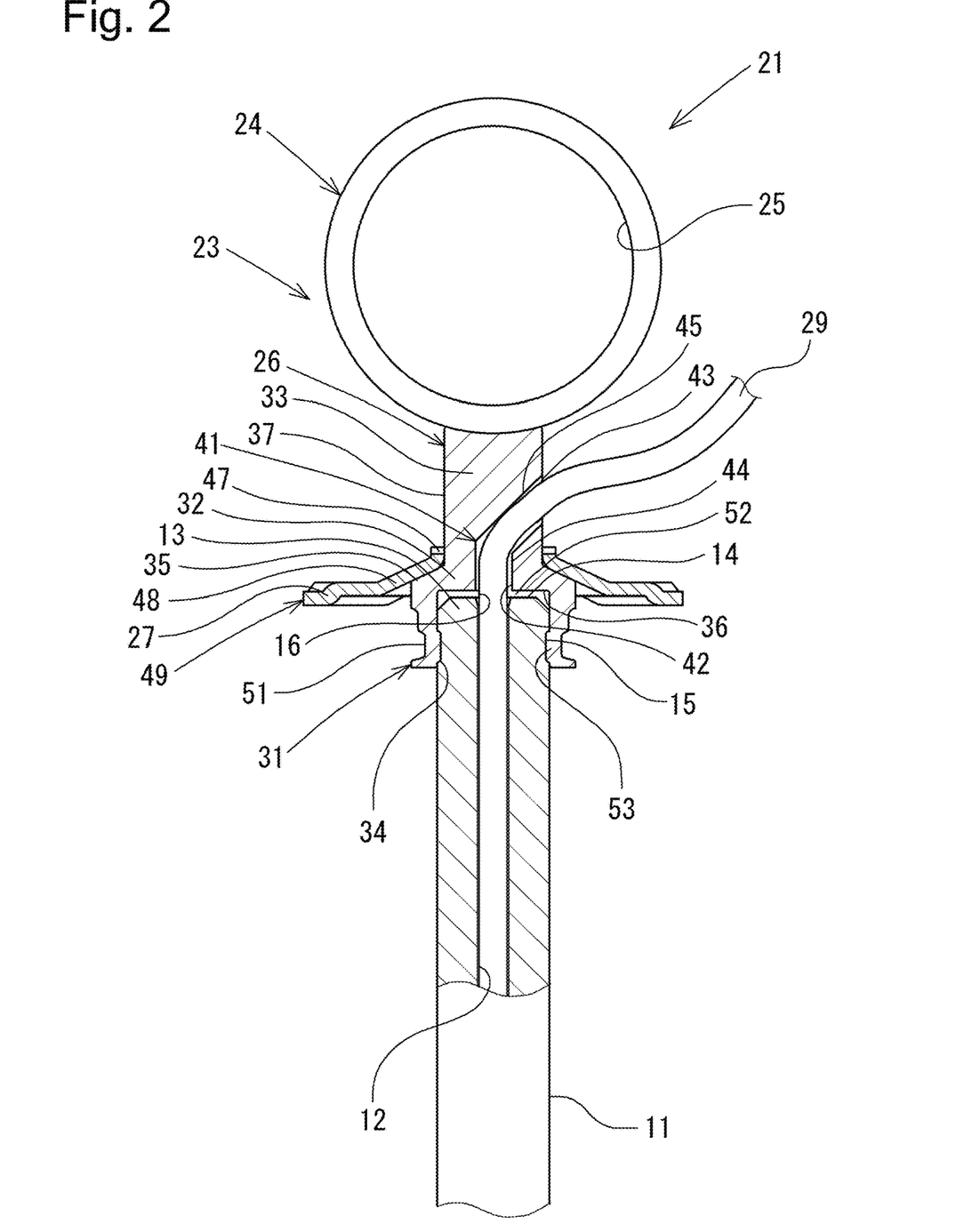
FIG. 2 is an enlarged view for illustrating a main part of FIG. 1 (excluding a dust cover).

As illustrated in FIG. 2, a fitting portion 13 having a substantially cylindrical shape to be fitted to an eye main body 23 of the mounting eye 21 is formed at the upper end portion of the rod 11. An annular groove 15 which is coaxial (concentric) with the rod 11 is formed in an outer peripheral surface (outer cylindrical surface) of the fitting portion 13. The eye main body 23 includes an eye portion 24, a joint portion 26, and a holding portion 27 (annular member). The eye portion 24 has a through hole 25 on an inner periphery side thereof, into which a bearing (not shown) is to be inserted. The joint portion 26 connects the eye portion 24 and the rod 11 to each other. The holding portion 27 is interposed between the eye portion 24 and the joint portion 26, and is configured to hold the dust cover 4.

The mounting eye 21 includes the eye main body 23, the joint portion 26, and the holding portion 27. Further, the rod 11 includes the actuator 28 (see FIG. 1) and a harness 29. The actuator 28 is fastened to the lower end portion (one end side) of the rod 11. The harness 29 has one side (lower side of FIG. 2) connected to the actuator 28 and another side (upper side of FIG. 2) extending through a hollow portion 12 of the rod 11 to the outside. The harness 29 inserted through the hollow portion 12 of the rod 11 is led to the outside of the rod 11 through an opening portion 16 formed at the center of an end surface 14 of the fitting portion 13 of the rod 11 (another end surface of the rod 11).

The joint portion 26 includes a connection tube portion 31 having a substantially cylindrical shape (tubular portion), a closing portion 32 (coupling portion), and a shaft portion 33. The closing portion 32 has a diameter larger than that of the connection tube portion 31 and is configured to close an upper end portion of the connection tube portion 31. The shaft portion 33 projects on the side of the closing portion 32 opposite to the connection tube portion 31. The fitting portion 13 of the rod 11 is inserted into the connection tube portion 31 of the joint portion 26 from the opening portion 34 on the side opposite to the closing portion 32. An annular surface 35 (step portion) of the closing portion 32 extending outward from a base-end peripheral edge of the shaft portion 33 has such a tapered shape that a diameter becomes larger as separating away from a base end of the shaft portion 33.

The eye main body 23 has a passage 41 which allows another side of the harness 29, that is, the harness 29 inserted through the hollow portion 12 of the rod 11 and led to the outside of the rod 11 from the opening portion 16 to be led to the outside through a side wall 37 of the shaft portion 33 of the joint portion 26. The passage 41 has an opening portion 42 on one side and an opening portion 43 on another side. The opening portion 42 is formed at the center of an end surface 36 of the closing portion 32 (bottom surface of the connection tube portion 31), and the opening portion 43 is formed in the side wall 37 of the shaft portion 33. The passage 41 is formed of a first passage 44 and a second passage 45. The first passage 44 linearly extends from the opening portion 42. The second passage 45 linearly extends from the opening portion 43.

An axis of the first passage 44 is located on an axis of the eye main body 23. In other words, the axis of the first passage 44 matches the axis of the eye main body 23. Meanwhile, an axis of the second passage 45 is arranged in such a manner as to intersect the axis of the first passage 44 (axis of the eye main body 23) and extends obliquely upward from the intersection to the side wall 37 of the shaft portion 33. With this configuration, the passage 41 has a gently bent shape in the cross section taken along a plane including the axis of the first passage 44 and the axis of the second passage 45. An inner diameter of the passage 41 is set larger than an inner diameter of the hollow portion 12 of the rod 11. Further, an axis of the joint portion 26, that is, axes of the connection tube portion 31, the closing portion 32, and the shaft portion 33 match the axis of the eye main body 23.

The holding portion 27 is a forged component and includes a cylindrical portion 47, a tapered portion 48, and a flange portion 49. The tapered portion 48 is connected to a lower end of the cylindrical portion 47 and extends in such a manner that a diameter becomes larger as separating away from the cylindrical portion 47. The flange portion 49 is connected to an outer peripheral edge portion (lower end) of the tapered portion 48 and extends radially outward.

The eye main body 23 is formed by integrating the eye portion 24, the joint portion 26, and the holding portion 27. For the integration, first, the cylindrical portion 47 of the holding portion 27 is fitted to the shaft portion 33 of the joint portion 26. Next, under a state in which the tapered portion 48 of the holding portion 27 is in abutment against the annular surface 35 (step portion) of the joint portion 26, the joint portion 26 and the holding portion 27 are joined (welded) to each other. After the joint portion 26 and the holding portion 27 are integrated, the shaft portion 33 of the joint portion 26 and the eye portion 24 are joined (welded) to each other. In the integrated eye main body 23, the axis of the joint portion 26 and the axis of the holding portion 27 match each other, and the axes of the joint portion 26 and the holding portion 27 (axis of the eye main body 23) are orthogonal to an axis (center line) of the through hole 25 of the eye portion 24.

As illustrated in FIG. 2, the connection tube portion 31 of the joint portion 26 has an annular recess 51 formed by plastic working (shrinking). For the plastic working, first, the another side of the harness 29, that is, the harness 29 led out from the opening portion 16 of the rod 11 is inserted into the passage 41 (first passage 44) through the opening portion 42 of the joint portion 26 of the eye main body 23, and then is led out through the first passage 44 and the second passage 45 from the opening portion 43 that is formed in the side wall 37 of the shaft portion 33 of the joint portion 26.

Next, the fitting portion 13 of the rod 11 is inserted into the connection tube portion 31 of the joint portion 26 of the eye main body 23. At this time, a gap 52 having a constant distance in the axial direction is formed between the end surface 14 of the fitting portion 13 of the rod 11 and the end surface 36 of the closing portion 32 of the joint portion 26. In this state, an outer periphery of the connection tube portion 31 of the joint portion 26 is plastically deformed (pushed in) radially inward over an entire periphery so that the annular recess 51 is formed in an outer peripheral surface of the connection tube portion 31. The recess 51 is not required to continue over an entire periphery on the outer periphery of the connection tube portion 31 and may be formed by partially caulking the outer periphery of the connection tube portion 31 at constant intervals along a circumferential direction.

Further, a position of the recess 51 in the axial direction (up-and-down direction of FIG. 2) with respect to the rod 11 is adjusted so that the recess 51 matches the annular groove 15 of the rod 11. A joining portion 53 having an annular shape is formed on an inner periphery side of the connection tube portion 31 of the joint portion 26. The joining portion 53 is formed by plastic working (shrinking) so that flesh (material) of the connection tube portion 31 flows into (plastic flow) the annular groove 15 of the rod 11. In such a manner, the eye main body 23 (mounting eye 21) is joined to the rod 11 by pushing, partially or over an entire periphery, an outer periphery of the joint portion 26 into the annular groove 15 of the rod 11. Then, an upper-end-side peripheral edge portion of the dust cover 4 (see FIG. 1) is plastically fastened to an outer-side peripheral edge portion of the flange portion 49 of the holding portion 27 so that the dust cover 4 is held by the eye main body 21.

In the above-mentioned structure described in Patent Literature 1 (hereinafter referred to as "related-art structure"), the mounting eye and the rod are fastened to each other by screwing. Thus, as an axial length of the fastening portion including an axial length of a locking nut (length in the axial direction) becomes longer, the stroke of the rod becomes shorter. Accordingly, when the axial length (total length) of the shock absorber is determined, it is difficult to secure the stroke of the rod. In other words, the axial length of the shock absorber with respect to the stroke of the rod becomes longer, and hence it is difficult to downsize the shock absorber.

Further, in the related-art structure, when the rod and the mounting eye are fastened to each other by screwing at the time of manufacture, the rod and the mounting eye are rotated relative to each other under a state in which the harness led out from the hollow portion of the rod is inserted through the slit of the mounting eye. Thus, man-hours are required for fastening. Further, the harness may be negatively affected. More specifically, an idea to prevent the harness from biting into the fastening portion or a jig for temporarily fixing the harness at the time of assembly is required, with the result that a large amount of man-hours are required.

In contrast, according to the first embodiment, the outer periphery of the joint portion 26 of the mounting eye 21 is pushed, partially or over an entire periphery, into the annular groove 15 of the rod 11 to join the mounting eye 21 to the rod 11. Further, the another side of the harness 29 extends through the passage 41 formed in the joint portion 26 from the opening portion 43 formed in the side wall 37 of the shaft portion 33 of the joint portion 26 to the outside.

As described above, in the first embodiment, the mounting eye 21 is fastened to the rod 11 by plastically deforming the joint portion 26. Thus, the axial length of the fastening portion can be set shorter than that of the related-art structure (screw fastening). According to the first embodiment, the stroke of the rod 11 in the damping-force adjustment shock absorber 1 of the control-valve built-in type in which the mounting eye 21 is fastened to the rod 11 can be secured. Further, when the stroke of the rod 11 is determined, the axial length (total length) of the shock absorber 1 can be set shorter as compared to that of the shock absorber to which the related-art structure is applied, thereby being capable of downsizing the shock absorber 1.

Further, according to the first embodiment, the annular surface 35 (step portion) is formed between the connection tube portion 31 (tubular portion) and the closing portion 32 (coupling portion) of the joint portion 26, and the tapered portion 48 of the holding portion 27 (annular member) is brought into abutment against the annular surface 35 to fasten the holding portion 27 to the joint portion 26. Thus, the holding portion 27 can easily be centered with respect to the joint portion 26, thereby being capable of reducing assembly man-hours.

Further, the relative rotation of the rod and the mounting eye which has been the problem of the screw fastening is eliminated, thereby being capable of improving productivity.

In the first embodiment, the another side of the harness 29 extends through the passage 41 formed in the joint portion 26 from the opening portion 43 formed in the side wall 37 of the shaft portion 33 of the joint portion 26 to the outside. In contrast, the another side of the harness 29 may extend from the groove portion (slit) formed in a side wall of the eye portion 24 to the outside. In this case, the axial length of the shaft portion 33 of the joint portion 26 can be further shortened, thereby being capable of further increasing the stroke of the rod 11 or further shortening the axial length (total length) of the shock absorber 1 to downsize the shock absorber 1.

Figure 3:
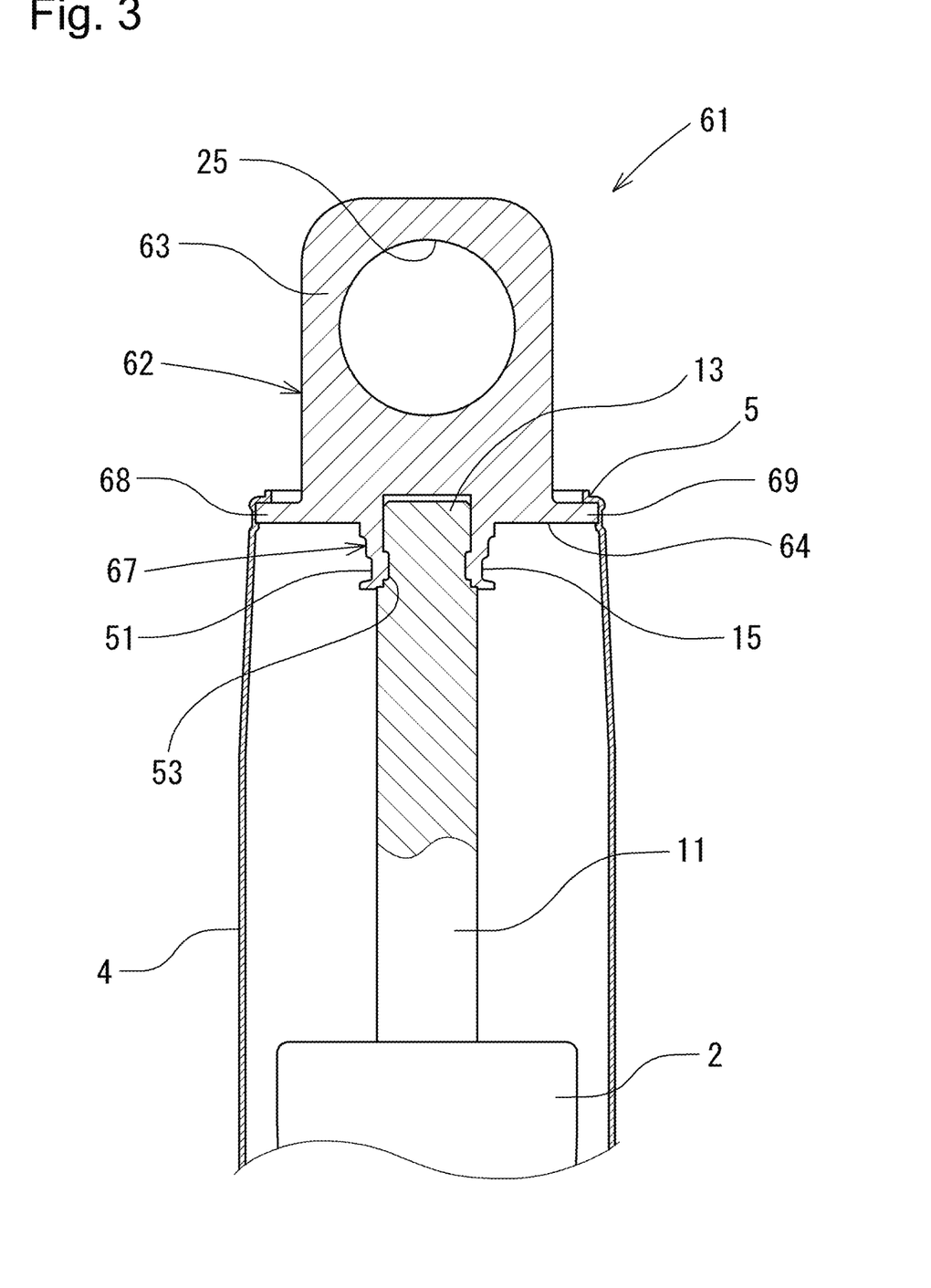
FIG. 3 is an enlarged view for illustrating a main part of a shock absorber according to a second embodiment.
Figure 4:
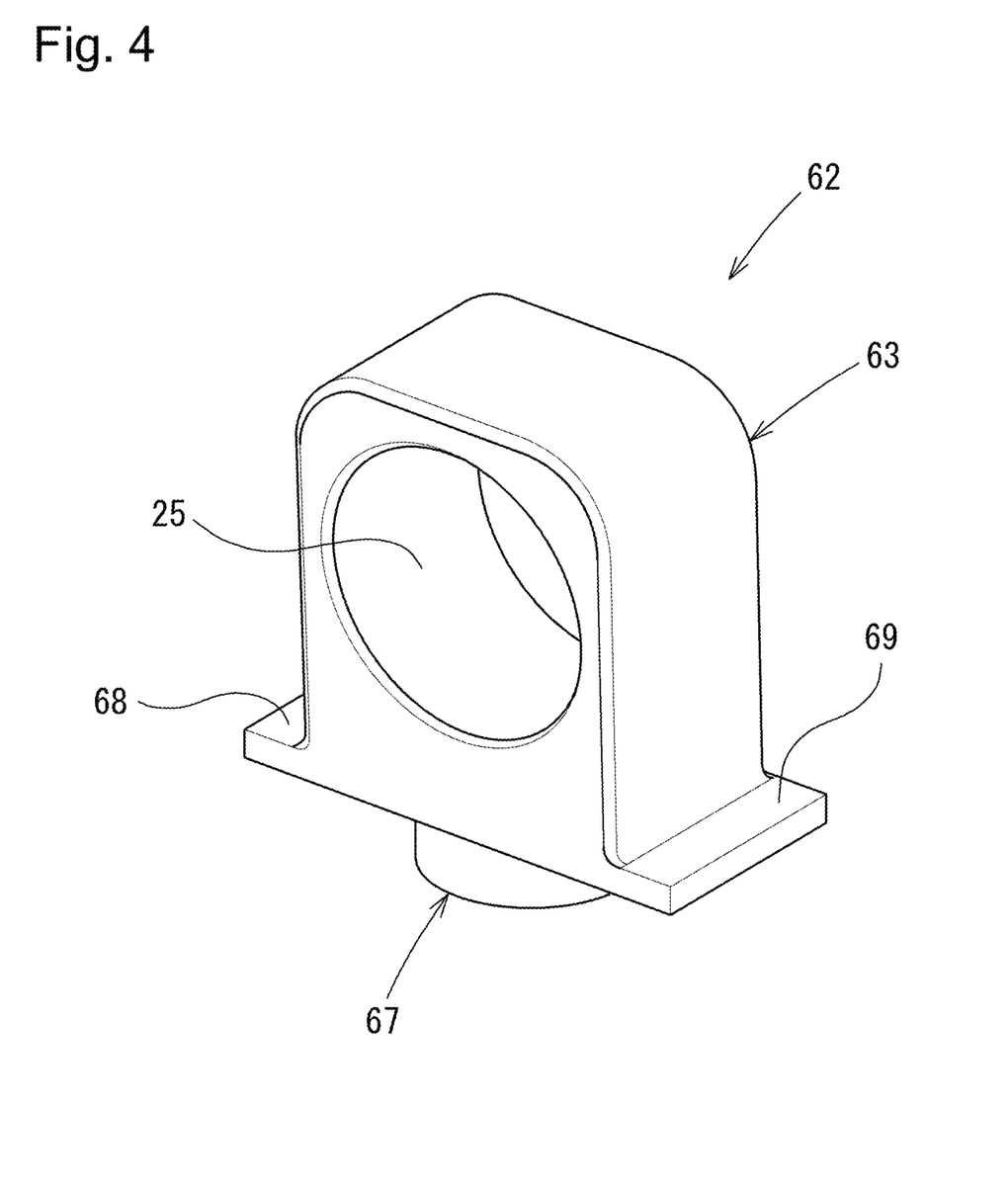
FIG. 4 is an explanatory view of the second embodiment and is a perspective view of a mounting eye.
Figure 5:
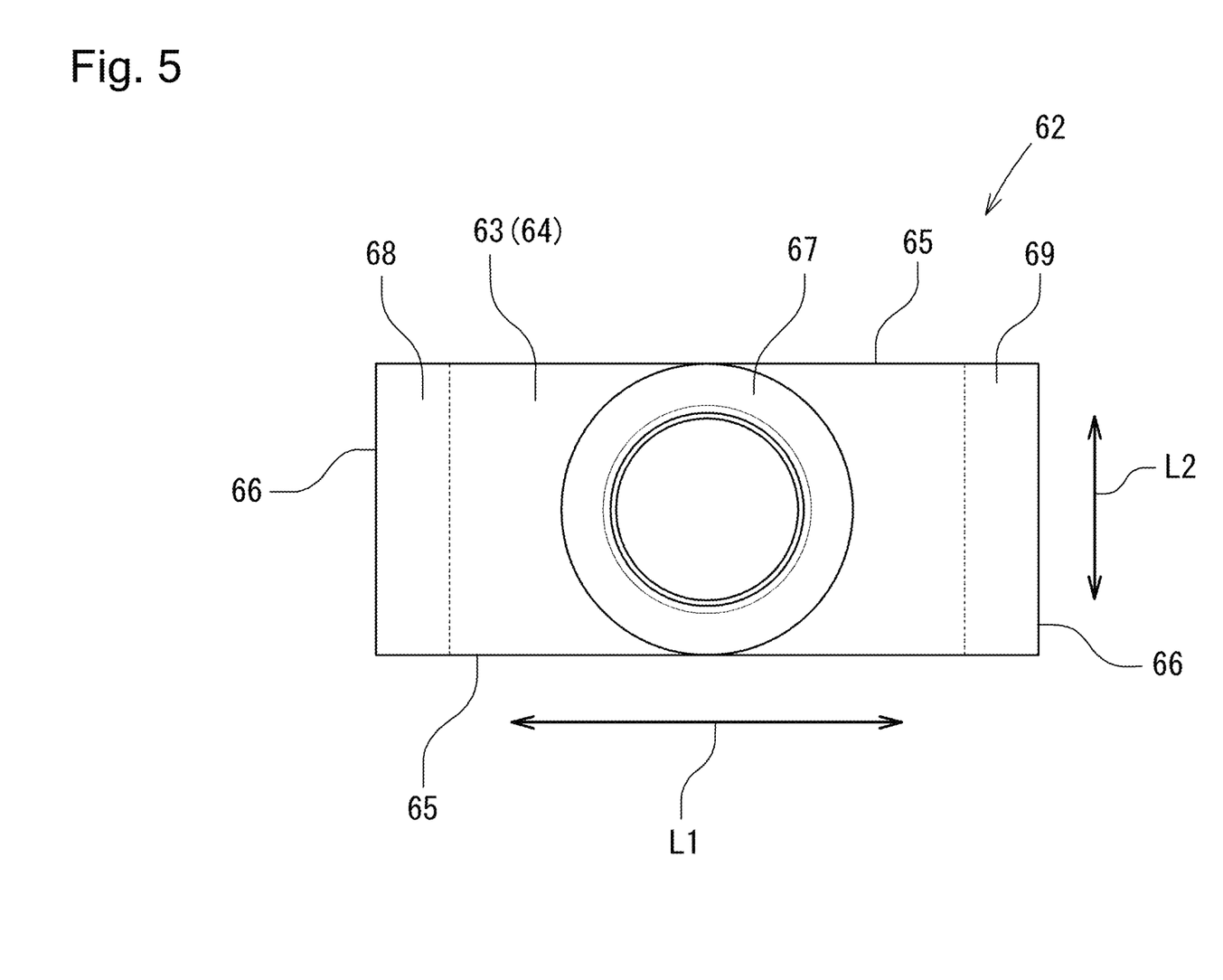
FIG. 5 is an explanatory view of the second embodiment and is a bottom view of the mounting eye.

(Second Embodiment) Next, a second embodiment of the present invention is described with reference to accompanying FIG. 3 to FIG. 5. Elements which are the same as or equivalent to those of the first embodiment are named the same and denoted by the same reference symbols, and detailed description is omitted.

In the above-mentioned shock absorber 1 according to the first embodiment, the eye main body 23 is integrated by joining the three members including the eye portion 24, the joint portion 26, and the holding portion 27 (annular member).

In contrast, in a shock absorber 61 according to the second embodiment, a mounting eye 62 (corresponding to the "eye main body 23" of the shock absorber 1 according to the first embodiment) is a component that is integrally molded by forging. The mounting eye 62 is formed of a long portion and a short portion in two radial directions L1 and L2 (see FIG. 5) which are orthogonal to each other on a projection plane from an axial one end side. In other words, the mounting eye 62 has a rectangular shape (oblong shape) in a parallel projection view (see FIG. 5) as viewed from the cylinder 2 side with projection lines parallel to the axis of the rod 11 and is formed of a long portion extending along a long side 65 and a short portion extending along a short side 66.

The mounting eye 62 includes an eye portion 63 having a substantially rectangular parallelepiped shape. A through hole 25 into which a bearing (not shown) is to be inserted is formed on an inner periphery side of the eye portion 63. The through hole 25 passes through the short portion side of the eye portion 63. In other words, the through hole 25 passes through the eye portion 63 in a direction along the short side 66 (radial direction L2). Flange portions 68 and 69 are formed at both ends of the long side 65 (long portion) on the rod 11 side of the eye portion 63 (lower end side of FIG. 3). The flange portions 68 and 69 project from a lower end portion of the eye portion 63 opposite to each other in the radial direction L1. The flange portions 68 and 69 each have a rectangular shape (oblong shape) in which a length of one side is the same as a length of the short side 66 in the above-mentioned parallel projection view.

The mounting eye 62 includes a joint portion 67 connecting the eye portion 63 and the rod 11 to each other. The joint portion 67 is formed on the rod 11 side of the eye portion 63 and projects toward the rod 11 side from the center of a lower surface 64 of the eye portion 63. The joint portion 67 has the same shape as the connection tube portion 31 (tubular portion) of the joint portion 26 of the first embodiment. The annular recess 51 formed by plastic working (shrinking) is formed on an outer periphery of the joint portion 67. On an inner periphery side of the joint portion 67, the annular joining portion 53 is formed. The joining portion 53 is formed by plastic working (shrinking) of pushing an inner peripheral surface of a side wall of the joint portion 67 into the annular groove 15 of the rod 11.

Then, the upper-end-side edge portion of the dust cover 7 (see FIG. 3) is plastically fastened to end edge portions of the flange portions 68 and 69 of the mounting eye 62 so that the dust cover 7 is held by the mounting eye 62. A shape of the dust cover 7 on a cross section of the opening portion 5 at the upper-end-side edge portion (cross section taken along a plane orthogonal to the axis of the rod 11) is a rectangular shape (oblong shape) which is substantially the same as the shape of the bottom portion (see FIG. 5) of the mounting eye 62 formed of the lower end portion and the flange portions 68 and 69 of the eye portion 63, and the dust cover 7 is formed (shaped) so as to be shifted to a circular shape as separating away from the opening portion 5.

In the above-mentioned first embodiment (see FIG. 2), the eye main body 23 is integrated by joining the joint portion 26 and the holding portion 27 (annular member) to each other and thereafter joining the eye portion 24 and the joint portion 26 to each other.

In contrast, in the second embodiment, the mounting eye 62 is a component which is integrally molded by forging. Accordingly, the number of components is reduced, and the joining (welding) step can be eliminated, thereby being capable of improving productivity and ease of assembly.

Further, in the second embodiment, the flange portions 68 and 69 (holding portions) of the mounting eye 62 on the rod 11 side have a rectangular shape (oblong shape), thereby being capable of easily producing the mounting eye 62 by forging. Further, as the mounting eye 62 is a component which is integrally molded by forging, mechanical characteristics of the mounting eye 62 can be improved.

Further, in the second embodiment, the mounting eye 62 is fastened to the rod 11 by plastically deforming the joint portion 67. Thus, the axial length of the fastening portion can be set shorter than that of the related-art structure (screw fastening). Accordingly, when the stroke of the rod 11 is determined, the axial length (total length) of the shock absorber 61 can be set shorter as compared to the shock absorber to which the related-art structure is applied, thereby being capable of downsizing the shock absorber 61.

Figure 7:
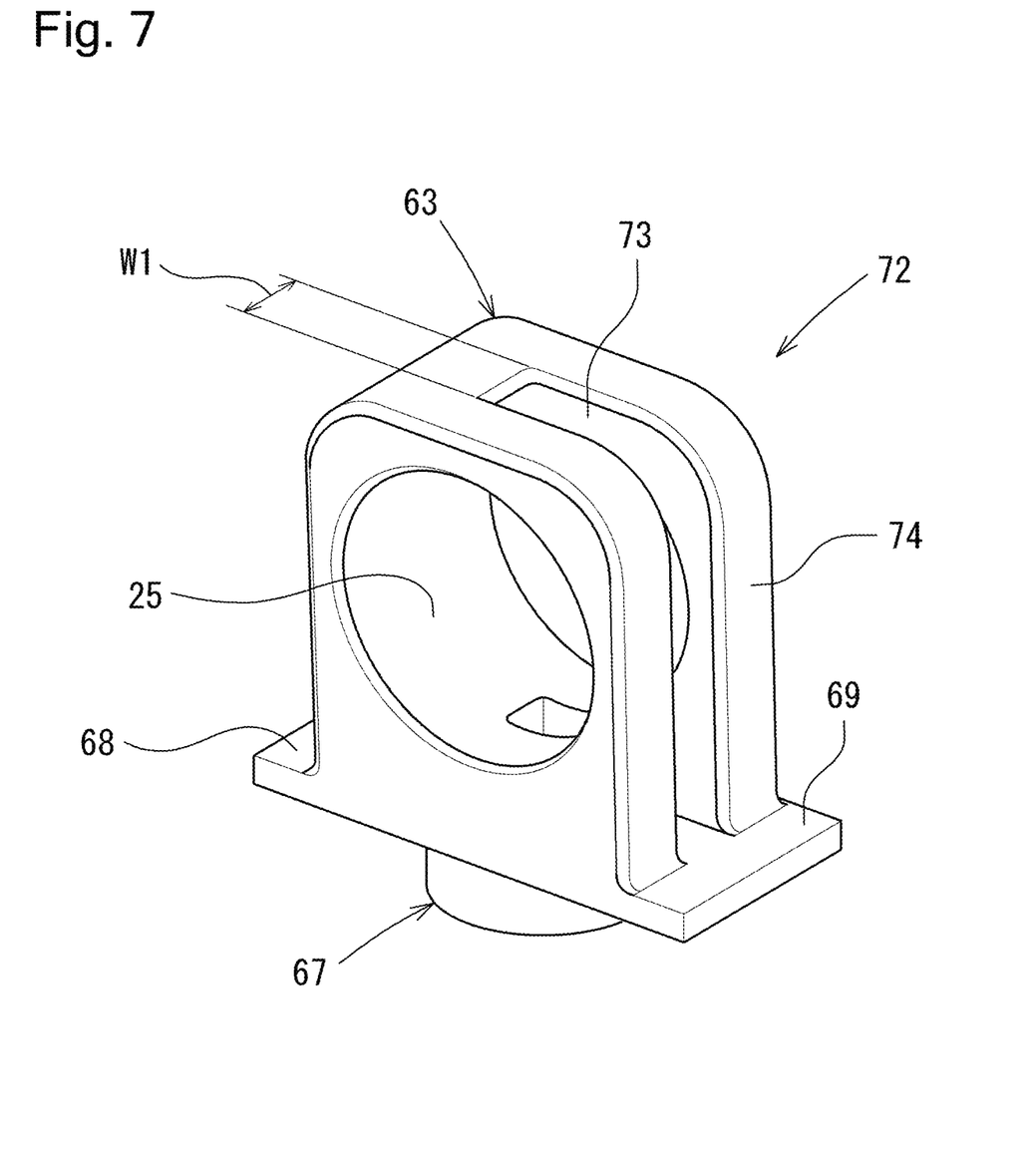
FIG. 7 is an explanatory view of the third embodiment and is a perspective view of a mounting eye.
Figure 8:
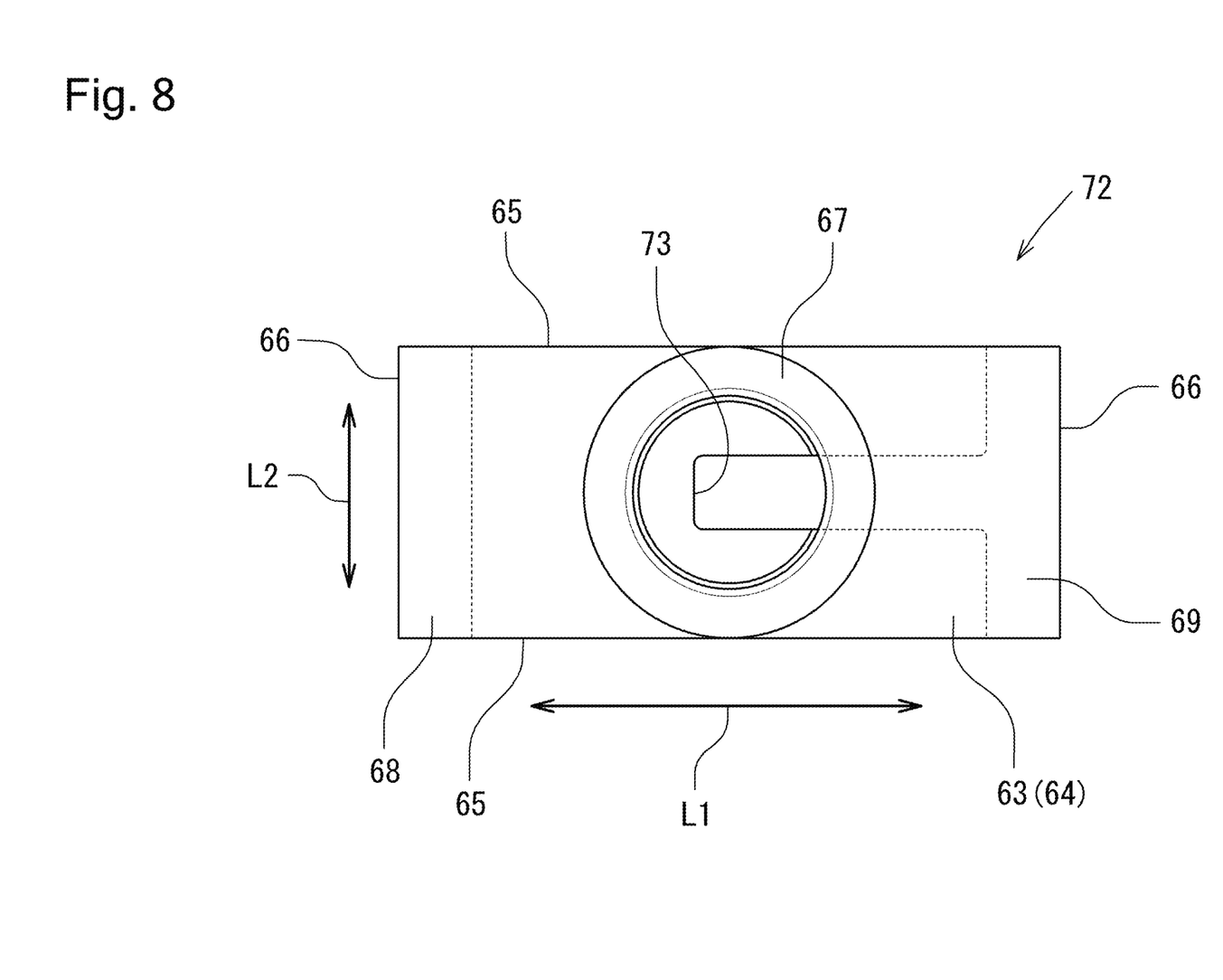
FIG. 8 is an explanatory view of the third embodiment and is a bottom view of the mounting eye.

(Third Embodiment) Next, a third embodiment of the present invention is described with reference to accompanying FIG. 6 to FIG. 8. Elements which are the same as or equivalent to those of the first or second embodiment are named the same and denoted by the same reference symbols, and detailed description is omitted.

A shock absorber 71 according to the third embodiment includes a mounting eye 72 having a groove portion 73. The mounting eye 72 is formed such that the groove portion 73 for allowing the harness 29 to pass therethrough is formed in the mounting eye 62 of the shock absorber 61 according to the second embodiment. Here, the structure other than the groove portion 73 of the mounting eye 71 is the same as that of the mounting eye 62 of the shock absorber 61 according to the second embodiment. Further, the rod 11 of the shock absorber 61 according to the second embodiment is a solid shaft, whereas the rod 11 of the shock absorber 71 according to the third embodiment has, similarly to the shock absorber 1 according to the first embodiment, the hollow portion 12 for allowing the harness 29 connected to the actuator 28 (see FIG. 1) to pass therethrough.

The groove portion 73 extends from an axial another end (upper end of FIG. 6) to an axial one end of the eye portion 63. The groove portion 73 has a constant width W1 in the radial direction L2, and the axial one end side is open to the inner periphery side of the joint portion 67. The width W1 is larger than the inner diameter of the hollow portion 12 of the rod 11 and is smaller than the outer diameter of the rod 11. Further, the groove portion 73 is formed such that, when the mounting eye 72 fastened to the rod 11 is viewed in the sight in the axial direction from the axial another end side, the entirety of the opening portion 16 of the rod 11 can be seen (overlooked) through the groove portion 73. The another side of the harness 29, that is, the harness 29 inserted through the hollow portion 12 of the rod 11 and led from the opening portion 16 to the outside of the rod 11 is inserted through the groove portion 73 formed in the eye portion 63 and is led through a side wall 74 of the eye portion 63 to the outside of the mounting eye 72.

The annular recess 51 formed by plastic working (shrinking) is formed in an outer peripheral surface of the joint portion 67. Further, the annular joining portion 53 is formed on the inner periphery side of the joint portion 67. The joining portion 53 is formed by plastic working (shrinking) of pushing the inner peripheral surface of the side wall of the joint portion 67 into the annular groove 15 of the rod 11. For the plastic working, the another side of the harness 29, that is, the harness 29 led out from the opening portion 16 of the rod 11 is inserted through the groove portion 73 of the mounting eye 72 and is led to the outside through the side wall 74 of the eye portion 63 of the mounting eye 72.

According to the third embodiment, the same actions and effects as those of the above-mentioned first and second embodiments can be obtained.

Figure 6:
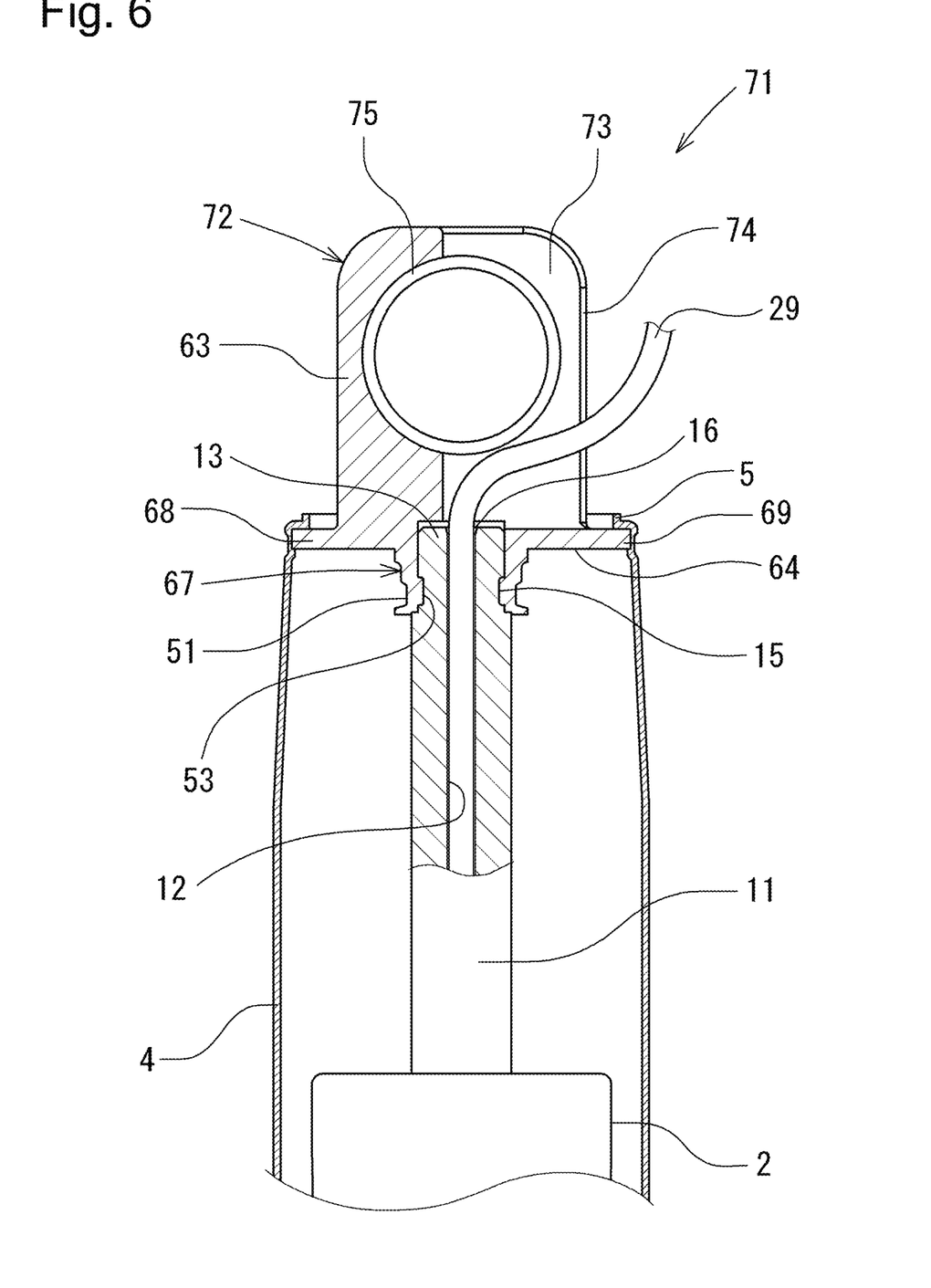
FIG. 6 is an enlarged view for illustrating a main part of a shock absorber according to a third embodiment.
Figure 9:
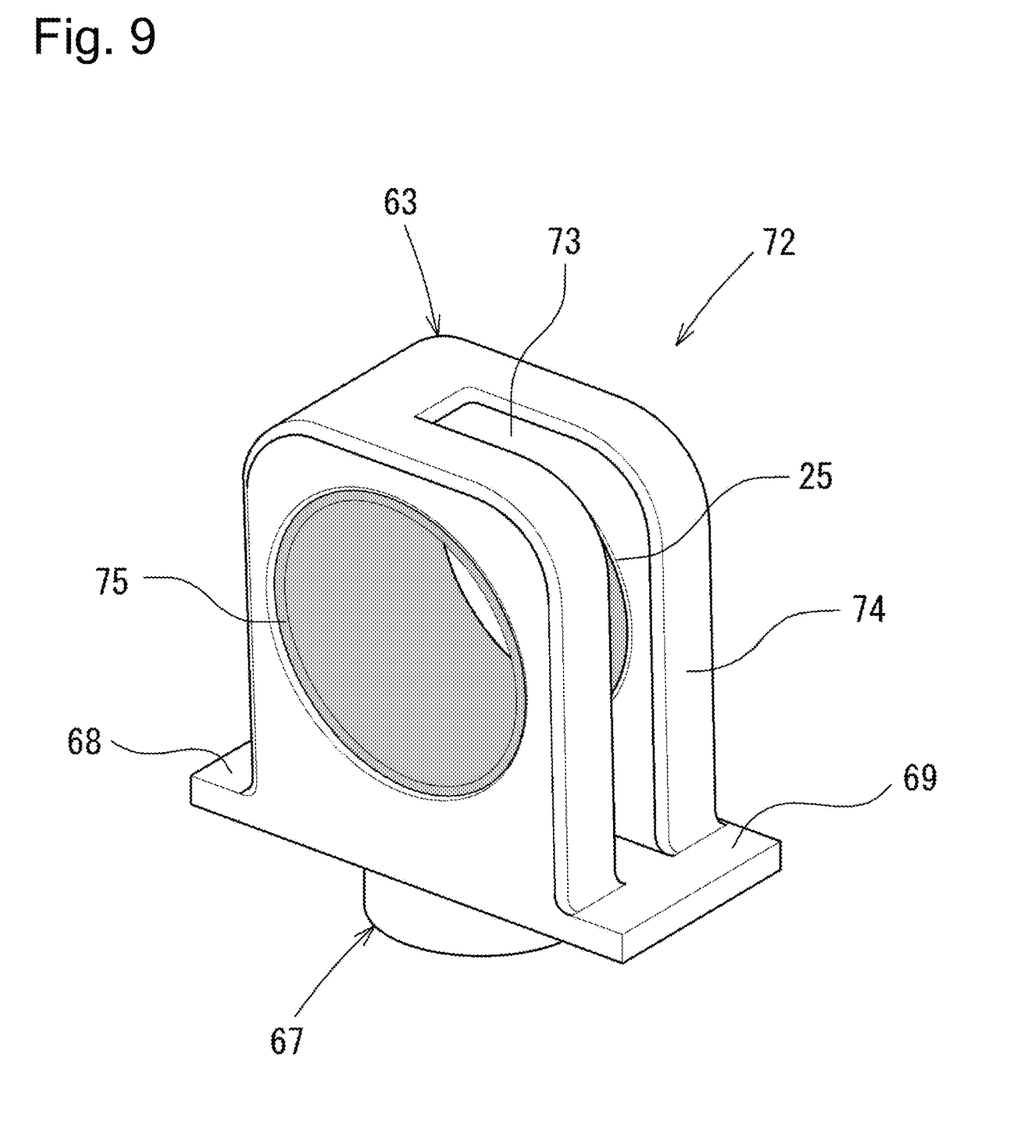
FIG. 9 is a perspective view of a mounting eye according to a modification example of the third embodiment.

As illustrated in FIG. 6 and FIG. 9, a bush 75 may be inserted into the through hole 25 of the eye portion 63 of the mounting eye 72, and the harness 29 may be set along an outer periphery of the bush 75, thereby being capable of preventing violent actions of the harness 29 inside the groove portion 73 and reducing the aggressiveness to the harness 29. With this configuration, the reliability of the shock absorber 71 can be enhanced.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2019-032810 filed on Feb. 26, 2019. All disclosed contents including Specification, Scope of Claims, Drawings, and Abstract of Japanese Patent Application No. 2019-032810 filed on Feb. 26, 2019 are incorporated herein by reference in their entirety.

REFERENCE SIGNS LIST 1 shock absorber, 2 cylinder, 3 piston, 11 rod, 12 hollow portion, 15 annular groove, 21 mounting eye, 24 eye portion, 25 through hole, 26 joint portion, 28 actuator, 29 harness, 37 side wall

The invention claimed is:
1. A shock absorber, comprising:
a cylinder having a working fluid charged therein;
a piston inserted in the cylinder;
a rod having one end coupled to the piston and an other end extending to an outside of the cylinder;
a mounting eye fastened to the other end of the rod,
wherein the mounting eye, when viewed in a direction of the rod, includes a long portion and a short portion, which are orthogonal to each other;
an eye portion, which passes through the short portion side, and into which a bearing is to be inserted on an inner periphery side;
rectangular flange portions formed at both ends of the long portion on the rod side of the eye portion; and
an engagement protrusion portion formed on the rod side of the eye portion and configured to connect the eye portion and the rod to each other.

2. The shock absorber according to claim 1,
wherein the rod has an annular groove formed in a portion of the rod on another end side to be inserted into the engagement protrusion portion,
wherein the engagement protrusion portion includes a joining portion configured to join the mounting eye and the rod to each other, and
wherein the joining portion is formed by pushing an inner peripheral surface of a side wall of the engagement protrusion portion into the annular groove.

3. The shock absorber according to claim 1,
wherein the rod is hollow,
wherein the rod has an actuator fastened thereto,
wherein the actuator has one side of a harness connected thereto, and
wherein the harness has another side extending through the hollow portion of the rod from a groove portion formed in the eye portion to an outside.

4. The shock absorber according to claim 3, wherein the groove portion extends from an axial another end to one end of the eye portion.

5. The shock absorber according to claim 1, further comprising a bush inserted on an inner periphery side of the eye portion.

6. The shock absorber according to claim 1, further comprising a dust cover mounted to the flange portion.

7. The shock absorber according to claim 2,
wherein the rod is hollow,
wherein the rod has an actuator fastened thereto,
wherein the actuator has one side of a harness connected thereto, and
wherein the harness has another side extending through the hollow portion of the rod from a groove portion formed in the eye portion to an outside.

8. The shock absorber according to claim 7, wherein the groove portion extends from an axial another end to one end of the eye portion.

9. The shock absorber according to claim 2, further comprising a bush inserted on an inner periphery side of the eye portion.

10. The shock absorber according to claim 3, further comprising a bush inserted on an inner periphery side of the eye portion.

11. The shock absorber according to claim 4, further comprising a bush inserted on an inner periphery side of the eye portion.

12. The shock absorber according to claim 2, further comprising a dust cover mounted to the flange portion.

13. The shock absorber according to claim 3, further comprising a dust cover mounted to the flange portion.

14. The shock absorber according to claim 4, further comprising a dust cover mounted to the flange portion.

* * * * *